July 16, 1935.  H. L. WHITFIELD  2,008,268
ARMATURE COIL POSITIONING DEVICE
Filed Sept. 6, 1934   4 Sheets-Sheet 1

INVENTOR
Harry L. Whitfield
BY
Spencer Hardman & Fehr
his ATTORNEYS

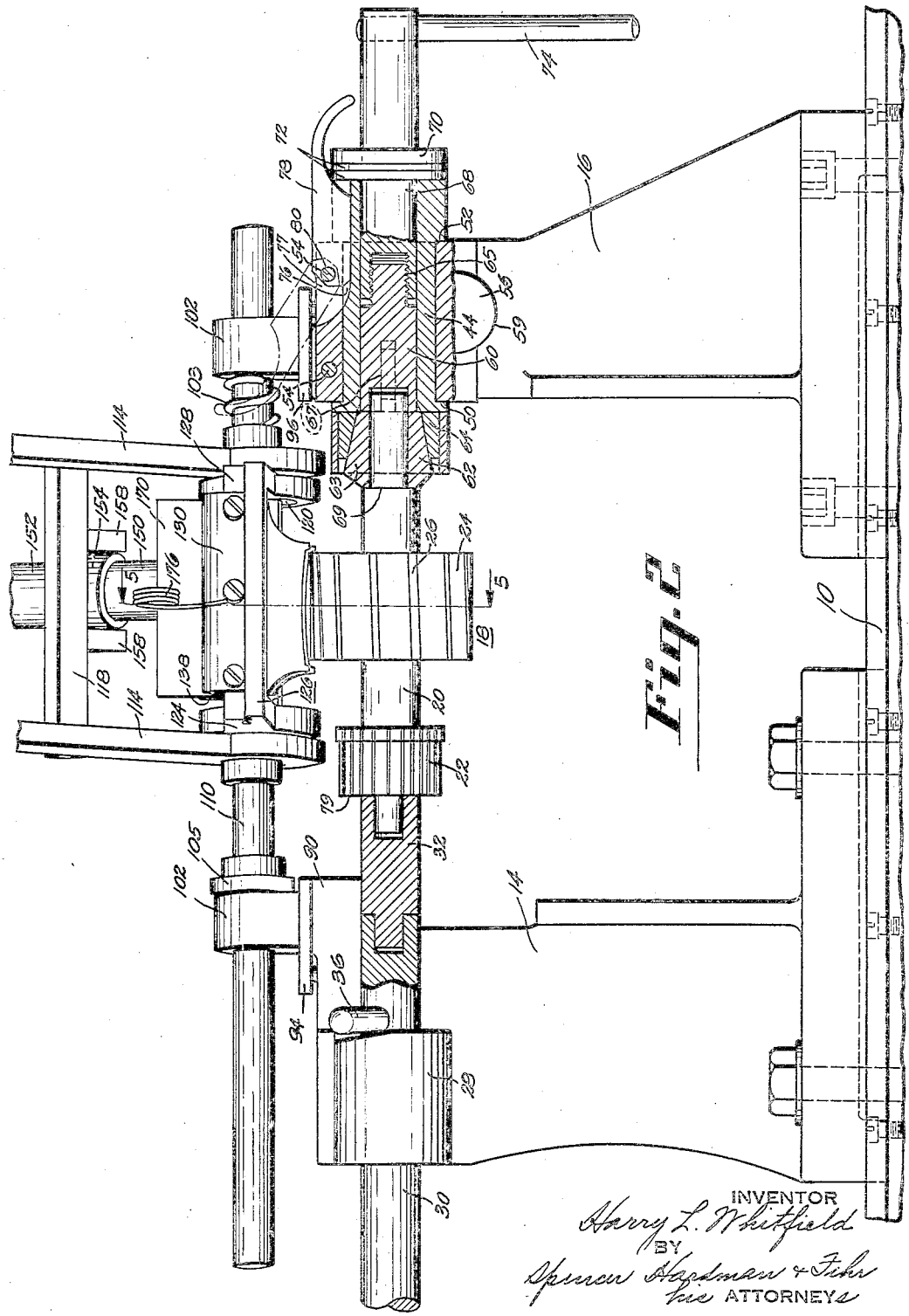

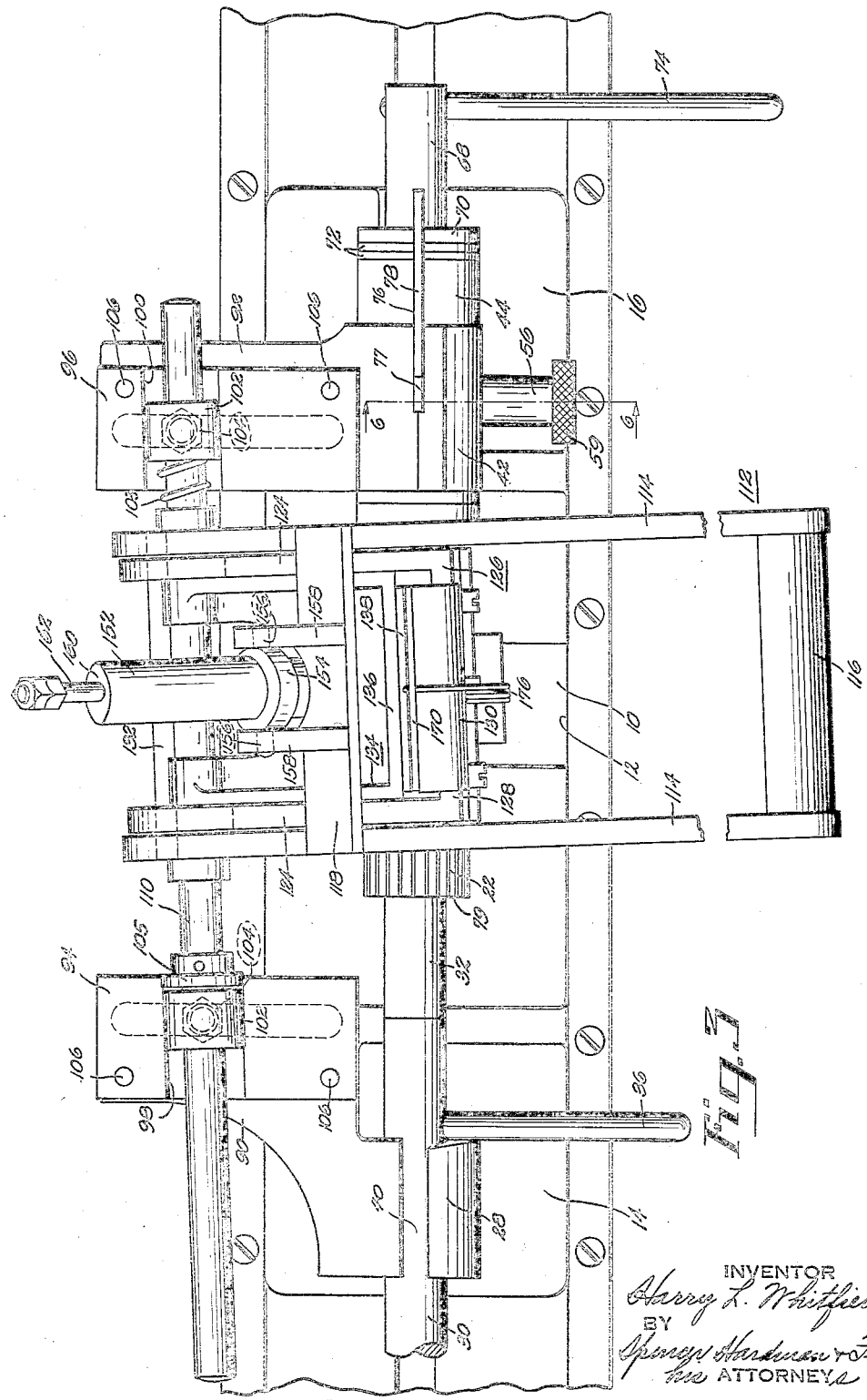

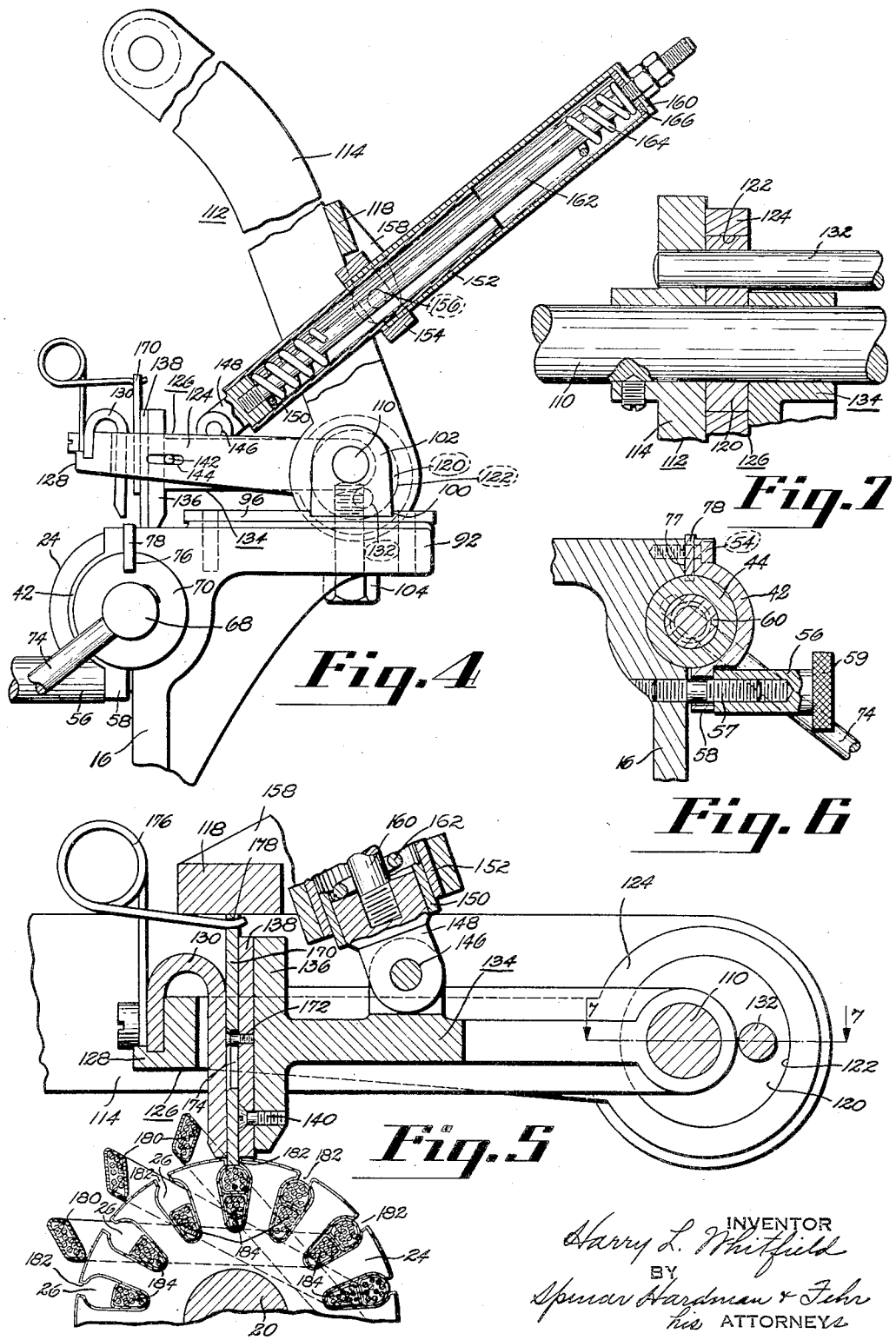

Patented July 16, 1935

2,008,268

UNITED STATES PATENT OFFICE 2,008,268

ARMATURE COIL POSITIONING DEVICE

Harry L. Whitfield, Anderson, Ind., assignor to General Motors Corporation, Detroit, Mich., a corporation of Delaware Application September 6, 1934, Serial No. 742,942

6 Claims. (Cl. 29—84)

This invention relates to armature assembling devices and more particularly to a device for positioning active coil sides in armature core slots.

It is an object of the present invention to provide a device for positioning active coil sides in skewed armature core slots.

It is another object of the present invention to adapt the device for positioning active coil sides in differently skewed armature core slots.

Further objects and advantages of the present invention will be apparent from the following description, reference being had to the accompanying drawings wherein a preferred embodiment of the present invention is clearly shown.

In the drawings:

Fig. 2 is a front elevation of the device, certain parts being shown in section.

Fig. 3 is a plan view of the device.

Fig. 4 is a side elevation of the device, certain parts being shown in section.

Fig. 5 is an enlarged fragmentary section taken on the line 5—5 of Fig. 2.

Fig. 6 is a fragmentary section taken on the line 6—6 of Fig. 3.

Fig. 7 is a fragmentary section taken on the line 7—7 of Fig. 5.

Figure 1:
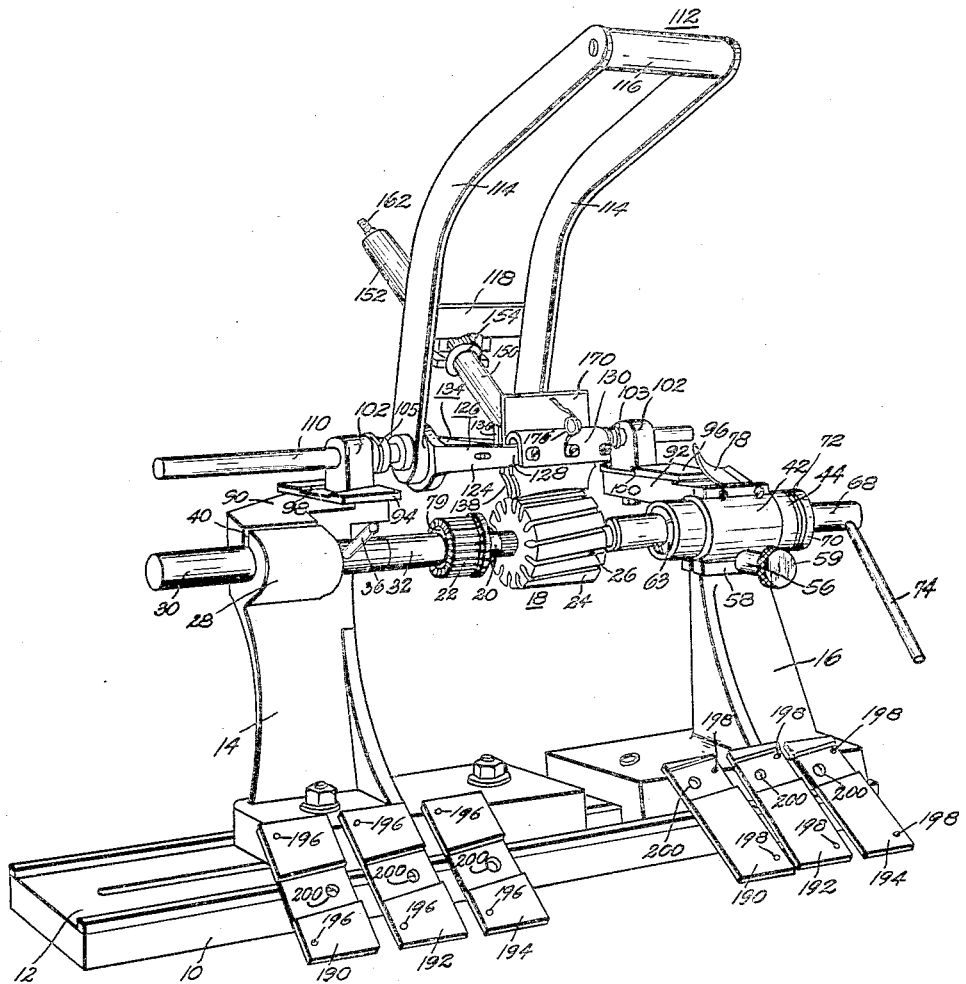
Fig. 1 is a perspective view of a device embodying the present invention.

Referring to the drawings and particularly Figs. 1 to 3 inclusive, a base 10, which may rest on a work bench or any other suitable support (neither shown), provides a track 12, locating and supporting two brackets 14 and 16. These two brackets provide bearings to be described for rotatably supporting an armature assembly 18 which includes an armature shaft 20, a commutator 22 and an armature core 24, having skewed core slots 26. Bracket 14 is provided with a split boss 28, longitudinally slidably supporting a cylindrical bar 30 one end of which press-fittedly receives a bearing 32 for journaling one end of the armature shaft 20. Bar 30 is also provided with a manually operable lever 36. The thickness of the lever 36 is such that, upon manual rocking of the same into alignment with the split 40 of boss 28, it may be moved into said split thereby retracting bar 30 as well as bearing 32 from the armature shaft in order to remove the armature assembly from the device after all core slots have received their assigned coil sides. Bracket 16 provides a semi-annular bearing half which together with a cap 42 provides a cylindrical bearing for a sleeve 44 which is longitudinally immovable with respect to its bearing by reason of two shoulders 50 and 52 which abut both end faces of said bearing. Bearing cap 42 is attached to bracket 16 by means of two countersunk screws 54 and a nut 56 which is threaded over a bolt 57, projecting from bracket 16 and extending through a flange 58 of bearing cap 42 as best shown in Fig. 6. Nut 56 is provided with a knurled head 59 for manual rotation in order to adjust the friction between the bearing and the sleeve 44. Journaled in the sleeve 44 is the cylindrical stem 60 having an equi-angularly split frusto-conical head 62, forming jaws 63 to be clamped against the other end of the armature shaft 20 by means of an internally tapered ring 64 and upon longitudinal movement of the stem 60 toward the right as viewed in Fig. 2. Such longitudinal movement of the stem 60 is accomplished by means of a threaded connection 65 between said stem and a cylindrical bar 68 which is journaled in sleeve 44 and provided with a collar 70, bearing against thrust washers 72 which in turn are bearing against an end face of sleeve 44. A manually operable lever 74 is secured to bar 68 for rotating the same. The stem 60 is splined at 67 to the sleeve 44 for unitary rotation with the latter. In order to longitudinally move the stem 60 upon manual rotation of bar 68 it is imperative that the former be prevented from rotating. This is accomplished by providing the sleeve 44 with a longitudinal groove 76 and locating therein a latch 78 which is pivotally mounted at 80 to one of the attaching screws 54 and located in a groove 77, formed jointly by the bracket 16 and bearing cap 42 as best shown in Fig. 3. The latch 78 may be rotated into the dot-and-dash position shown in Fig. 2 in order to clear groove 76 of sleeve 44. In order to remove an armature assembly from the bearing 32 and the jaws 63 and place a new assembly therein, the operator will throw latch 78 into the full line position shown in Fig. 2 and manipulate lever 74 so as to rotate bar 68 in order to release the gripping jaws 63 from the armature shaft. Thereafter the operator will rock lever 36 into alignment with the split 40 and longitudinally shift bar 30 and bearing 32 away from the armature shaft by pushing lever 36 into the split 40 a sufficient distance so that the armature shaft may be shifted longitudinally out of the open jaws 63 and then laterally removed from between the jaws and the bearing 32. The armature shaft of a new assembly is then inserted longitudinally into the open jaws 63 until a shoulder 69 of the armature shaft engages the jaws. Thereafter bar 30 and bearing 32 are shifted longitudinally by manipulation of lever 36 until the bearing 32 engages the end face 79 of the commutator 22 of the assembly.

At that time the lever 36 has been moved beyond the split 46 and is then rocked substantially into the position shown in Fig. 2 in order to lock bar 30 and bearing 32 in the position shown in that figure. By properly manipulating lever 74 while the latch 78 is in the full line position shown in Fig. 2 the jaws 63 will grip the armature shaft. After the operator throws latch 78 into the dot-and-dash position shown in Fig. 2, lever 74 can be used for indexing the armature assembly without releasing the jaws from gripping engagement with the armature shaft as can be readily understood.

The brackets 14 and 16 are provided with platforms 90 and 92, respectively, which support bases 94 and 96, respectively, having inclined tracks 98 and 100, respectively, for receiving standard bearing brackets 102. The bases 94 and 96 are secured to their respective platforms and the bearing brackets 102 are secured to the bases by means of bolts 104 as best shown in Fig. 4. The bases 94 and 96 are furthermore accurately located on their respective platforms by means of dowel pins 106 which project from the platforms. The bearing brackets 102 rotatably support a coil positioning device to be described presently which more particularly aligns the second active side of an armature coil with a core slot 26 and inserts the aligned coil side into said core slot, the first active sides of the armature coils having been previously deposited in the core slots in any suitable manner. Journaled in the bearing brackets 102 is a shaft 110 on which is mounted in any suitable manner a U-shaped operating lever 112 consisting of two parallel arms 114 which are joined together at their open ends by a handle bar 116. The parallel arms 114 are furthermore joined together by means of a cross member 118 which is welded or otherwise secured thereto. The shaft 110 is held against longitudinal movement by means of a spring 103 which is interposed between an arm 114 of the operating lever 112 and a bearing bracket 102 and normally retains a collar 105, pinned to the shaft 110, in engagement with the other bearing bracket 102. Journaled on the shaft 110 are two spaced discs 120, having eccentric peripheries 122 on which are journaled the parallel arms 124 of an intermediate U-shaped lever 126. Attached by suitable screws to the yoke 128 of said intermediate lever is an inverted U-plate 130. A rod 132, received by both arms 114 of the operating lever 112, projects through holes in the discs 120 for rotating the latter whenever the operating lever is rotated. Also, journaled on the shaft 110 is still another U-shaped lever 134 to the yoke 136 of which is attached a plate 138 by means of screws 140. Pins 142, projecting from each arm of lever 134, are received by oblong slots 144 which are provided by the arms 124 of lever 126, whereby the two levers 126 and 134 are prevented from rotating relative to each other as can be readily understood. Pivotally mounted at 146 to the lever 134 is a clevis 148 to which is attached a long tube 150, telescoping with another tube 152 which is attached to a ring 154, having two diametrically opposed projecting pins 156 which are journaled in spaced lugs 158 of the cross bar 118 as best shown in Fig. 3. Threaded into the clevis 148 and passing through the bottom 160 of tube 152 is a rod 162 which is surrounded by a compression spring 164, interposed between the clevis 148 and a washer 166 on the bottom 160 of tube 152. The parallel plates 130 and 138 are normally resting against the periphery of the armature core 24 by gravity of the levers 112, 126 and 134. The spring 164 normally separates the operating lever 112 from the levers 126, 134 so that lever 112 normally assumes the position shown in Figs. 1 or 4, in which the rod 132 and discs 120 assume the position shown in Fig. 4 so that plate 130 is most retracted from plate 138 as can be readily understood. An ejector blade 170 is slidable along plate 138 and retained thereon by means of a plurality of screws 172, received by said plate and passing through oblong slots 174 of blade 170. A coiled spring 176 is attached with one end to the yoke 128 of lever 126, the other end thereof projecting through a hole 178 of blade 170 so as normally to retract the same into the position shown in Fig. 4.

In operating the machine, an operator properly deposits an armature assembly 18 in the bearing 32 and the jaws 63 and clamps the same in the earlier described manner to the armature shaft 20. The operator next throws the latch 78 from the full-line position into the dot-and-dash position shown in Fig. 2 so as to be able manually to index the armature assembly by manipulating the lever 74. By slightly raising the operating lever 112 beyond the position shown in Fig. 4 the levers 126 and 134 with their plates 130 and 138, respectively, are slightly withdrawn from the core periphery whereupon the operator rotates the assembly until a coil side 180, resting loosely on the core periphery, aligns with the extremely spaced plates 130, 138, permitting these plates then to be lowered toward the core periphery so that the aligned coil side will be located intermediate these two plates. The operator, while retaining the plates 130, 138 in close proximity to the core periphery further rotates the assembly until the core slot 26 which is to receive the coil side is in substantial alignment with the spaced plates 130, 138. More particularly the operator will align one side wall of the core slot entrance with the relatively stationary plate 138. While holding the armature assembly in the position in which said core slot is aligned with the coil side intermediate the plates 130, 138, the operator rotates the operating lever 112 from the position shown in Fig. 4 to that shown in Fig. 5 whereby the rod 132 rotates the discs 120 in such manner that the eccentric peripheries thereof cause an approaching movement of the plate 130 toward the relatively stationary plate 138. Such approaching movement of the plate 130 toward its companion plate 138 causes the intermediate coil side 180 to be squeezed into such thickness that it may easily pass through the entrance 182 of the aligned core slot 26. Shortly before the operating lever reaches the position shown in Fig. 5 the cross bar 118 engages and moves the ejector blade 170 from the position shown in Fig. 4 into that shown in Fig. 5 against the tendency of spring 176 to maintain the ejector blade in the position shown in Fig. 4, thereby forcing the squeezed coil side through the core slot entrance into the core slot proper and on top of the previously deposited coil side 184. After this is accomplished, the operator merely releases the operating lever 112 whereupon the spring 164 forces the same into the inoperative position shown in Figs. 1 and 4, thereby causing plate 130 to retract from plate 138 as can be readily understood. The operator then catches the next following coil side which rests on the core periphery between the companion plates 130, 138 and by repeating the just mentioned operations, positions the same in the consecutive core slot on top of a previously deposited coil side. These operations are repeated by the operator until all core slots have received a second coil side whereupon the finished armature assembly is removed from the machine and another one deposited thereon in the earlier explained manner.

In order that the companion plates 130 and 138, which together form a guide groove for a coil side into a core slot, may substantially engage the core periphery along a skewed core slot 26, the core engaging surfaces of these plates are slightly concave as best shown in Fig. 2.

The present device may be applied for the positioning of second coil sides into differently skewed armature core slots as long as certain dimensions of the armature assemblies do not materially vary from standard dimensions of an armature assembly upon which the construction of the device was based. It is therefore imperative that the armature shafts of armature assemblies having differently skewed core slots are substantially alike at least as far as dimensions of the supported shaft ends are concerned. It is likewise imperative that the core lengths of armature assemblies having differently skewed armature core slots are substantially the same. If these conditions prevail, the device may be applied for the positioning of second coil sides into differently skewed core slots by merely exchanging the bases 94, 96 with others, having differently aligned tracks, whereby the coil side positioning device, which is rotatable in the standard bearings 102, is properly aligned with differently skewed core slots of other armature assemblies. In the present instance three pairs of companion bases 190, 192 and 194 are shown in Fig. 1. Each pair of bases is provided with a differently inclined track for positioning the standard bearings 102 of the coil positioning device. Each one of these bases is provided with holes 196 and 198, respectively, for receiving the dowel pins 106, and a hole 200 through which the fastening screws 104 are adapted to project. It can thus be understood that by simply replacing the bases for the standard bearings 102, the entire device may in the present instance be applied for at least four species of differently skewed armature core slots.

While the embodiment of the present invention as herein disclosed, constitutes a preferred form, it is to be understood that other forms might be adopted, all coming within the scope of the claims which follow.

1. In a device of the character described, the combination of means for rotatably supporting armatures having skewed core slots; means for inserting a coil side into an aligned core slot; and interchangeable means for correlating the inserting means with differently skewed armature core slots.

2. In a device of the character described, the combination of means for rotatably supporting armatures having skewed core slots; means for inserting a coil side into an aligned core slot; and interchangeable means for supporting the inserting means and for correlating the same with differently skewed armature core slots.

3. In a device of the character described, the combination of means for rotatably supporting armatures having skewed core slots; a mechanism for aligning a coil side with a core slot and for inserting the aligned coil side therein; bearings for rotatably supporting the mechanism; and interchangeable bearing supporting bases for correlating the mechanism with differently skewed armature core slots.

4. In a device of the character described, the combination of means for rotatably supporting armatures having skewed core slots; a mechanism for aligning a coil side with a core slot and for inserting the aligned coil side therein; bearings for rotatably supporting the mechanism; and interchangeable bases having tracks differently inclined relative to a supported armature axis and adapted to receive the bearings thereon for correlating the mechanism with differently skewed armature core slots.

5. In a device of the character described, the combination of means for rotatably supporting an armature having skewed core slots; means for inserting a coil side into an aligned core slot, said means including two parallel spaced plates between which the coil side is located and which form a groove guiding said coil side into the aligned core slot, said plates being movable into engagement with the core periphery and the core engaging surfaces being concave so as to engage the core periphery along both sides of the skewed core slot.

6. In a device of the character described, the combination of means for rotatably supporting armatures having skewed core slots; a mechanism for inserting a coil side into an aligned core slot, said mechanism including two parallel spaced plates between which the coil side is located and which form a groove guiding said coil side into the aligned core slot, said plates being movable into engagement with the core periphery and the core engaging surfaces being concave so as substantially to engage the core periphery along both sides of differently skewed slots of different armature cores; and means for correlating the mechanism with armatures having differently skewed core slots so that the plates extend parallel to the slots of an armature core.

HARRY L. WHITFIELD.